US011681570B2

United States Patent
Kommalapati et al.

(10) Patent No.: US 11,681,570 B2
(45) Date of Patent: Jun. 20, 2023

(54) ENVIRONMENT-BASED DEVICE CONDITION INDICATOR FOR PRIORITIZED DEVICE-CLOUD INTERACTIONS

(71) Applicant: Microsoft Technology Licensing, LLC, Redmond, WA (US)

(72) Inventors: Hanumantha Rao Kommalapati, Kirkland, WA (US); Atulya Beheray, Sammamish, WA (US); Arun Mannengal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/162,671

(22) Filed: Jan. 29, 2021

(65) Prior Publication Data

US 2022/0245006 A1    Aug. 4, 2022

(51) Int. Cl.
G06F 3/00     (2006.01)
G06F 9/54     (2006.01)
G06F 9/48     (2006.01)
G16Y 10/75    (2020.01)
G16Y 20/20    (2020.01)
G16Y 40/20    (2020.01)

(52) U.S. Cl.
CPC ............ *G06F 9/542* (2013.01); *G06F 9/4881* (2013.01); *G16Y 10/75* (2020.01); *G16Y 20/20* (2020.01); *G16Y 40/20* (2020.01)

(58) Field of Classification Search
CPC ....................................................... G06F 9/54
See application file for complete search history.

(56) References Cited

U.S. PATENT DOCUMENTS

| 10,645,181 | B2 | 5/2020 | Hoffner et al. | |
|---|---|---|---|---|
| 2015/0134761 | A1* | 5/2015 | Sharma | H04W 4/021 709/204 |
| 2017/0235783 | A1* | 8/2017 | Chen | H04L 67/12 707/691 |
| 2018/0060159 | A1* | 3/2018 | Justin | G06F 11/0787 |

(Continued)

FOREIGN PATENT DOCUMENTS

| WO | 2012080414 A2 | 6/2012 |
|---|---|---|
| WO | 2017207063 A1 | 12/2017 |

(Continued)

OTHER PUBLICATIONS

Mohamed Shaban, A Study of Distributed Compressive Sensing for the Internet of Things (IoT). (Year: 2018).*

(Continued)

*Primary Examiner* — Lechi Truong
(74) *Attorney, Agent, or Firm* — Holzer Patel Drennan (57) ABSTRACT

A method for reducing latencies associated with anomaly detection and response in an internet-of-things (IoT) device includes analyzing sensor data collected by the IoT device to evaluate various predefined anomaly criteria and dynamically assigning the IoT device a condition indicator based on the evaluation of the predefined anomaly criteria, where the condition indicator is indicative of detection or non-detection of one or more potential anomalies. The method further provides for selectively implementing an IoT event prioritization scheme based on the dynamically-assigned condition indicator.

17 Claims, 5 Drawing Sheets

(56) References Cited

U.S. PATENT DOCUMENTS

| | | | | |
|---|---|---|---|---|
| 2018/0270295 | A1* | 9/2018 | Seed | H04L 67/104 |
| 2018/0285234 | A1* | 10/2018 | Degaonkar | G06F 11/0709 |
| 2019/0380037 | A1* | 12/2019 | Lifshitz | H04W 8/08 |
| 2019/0387011 | A1* | 12/2019 | Du | H04L 63/20 |
| 2020/0403871 | A1* | 12/2020 | AbiEzzi | H04L 41/12 |
| 2021/0099881 | A1* | 4/2021 | Loupos | H04W 12/06 |
| 2021/0399986 | A1* | 12/2021 | Zhao | H04L 47/12 |
| 2022/0366494 | A1* | 11/2022 | Cella | G06N 3/088 |

FOREIGN PATENT DOCUMENTS

| | | | | |
|---|---|---|---|---|
| WO | WO-2020023325 | A1 * | 1/2020 | H04L 12/4625 |
| WO | WO-2022239952 | A1 * | 11/2022 | |

OTHER PUBLICATIONS

Sabin Bhandari, Latency Minimization in Wireless IoT Using Prioritized Channel Access and Data Aggregation. (Year: 2017).*

Elias De Coninck, Distributed Neural Networks for Internet of Things: The Big-Little Approach. (Year: 2016).*

"IoT Device Connection Efficiency Guidelines", Retrieved from: gsma.com/newsroom/wp-content/uploads/TS.34-v6.0.pdf, Apr. 14, 2020, pp. 1-78.

Benson, et al., "FireDeX: a Prioritized IoT Data Exchange Middleware for Emergency Response", In Proceedings of the 19th International Middleware Conference, Dec. 10, 2018, 14 Pages.

Beshley, et al., "End-to-End QoS "Smart Queue" Management Algorithms and Traffic Prioritization Mechanisms for Narrow-Band Internet of Things Services in 4G/5G Networks", In Journal of Sensors, vol. 20, Issue 8, Jan. 2020, pp. 1-30.

Bhandari, et al., "Latency Minimization in Wireless IoT Using Prioritized Channel Access and Data Aggregation", In Proceedings of IEEE Global Communications Conference, Dec. 4, 2017, 6 Pages.

Hossain, et al., "An Internet of Things-based health prescription assistant and its security system design", In Journal of Future generation computer systems, May 1, 2018, pp. 1-19.

Kim, et al., "Message Queue Telemetry Transport Broker with Priority Support for Emergency Events in Internet of Things", In Journal of Sensors and Materials, vol. 30, No. 08, Jan. 1, 2018, pp. 1715-1721.

Rashtian, et al., "Balancing Message Criticality and Timeliness in IoT Networks", In Journal of IEEE Access, Sep. 30, 2019, 9 Pages.

Shi, Jingyu, "Notifying your users with FCM", Retrieved from: https://android-developers.googleblog.com/2018/09/notifying-your-users-with-fcm.html, Sep. 18, 2018, 9 Pages.

Vunvulea, Radu, "Azure IoT Hub and message priority", http://vunvulearadu.blogspot.com/2017/01/azure-iot-hub-and-message-priority.html, Retrieved from: Jan. 6, 2017, 17 Pages.

* cited by examiner

ENVIRONMENT-BASED DEVICE CONDITION INDICATOR FOR PRIORITIZED DEVICE-CLOUD INTERACTIONS

BACKGROUND

Internet-of-things (IoT) devices receive control commands and send large amounts of operational telemetry from and to cloud-based locations, such as IoT hubs, edge devices, etc. Often times, the vast quantity of device I/O (e.g., outgoing messages and incoming commands) causes congestion of available transmission lines and processing resources, amounting to significant processing and response latencies. If a device is observing a significant problem, certain types of monotonic communications may become inconsequential and yet still clog up available transmission channel(s), hindering resolution of the problem. Likewise, incoming commands also interfere with the actions being taken in response to the criticality of the environment by the device control logic.

SUMMARY

A method of reducing latencies associated with anomaly detection and response in an internet-of-things (IoT) device includes analyzing sensor data from a surrounding physical environment and based on an analysis of the sensor data, dynamically assigning the IoT device a condition indicator. The condition indicator is based on the evaluation of the predefined anomaly criteria and indicative of detection or non-detection one or more potential anomalies. The method further provides for selectively implementing an IoT event prioritization scheme based on the dynamically-assigned condition indicator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

The herein disclosed technology provides a mechanism for prioritizing various incoming and outgoing cloud interactions of an IoT device based on anomalies that are detected at the IoT device. If, for example, environmental data sensed by the IoT device is indicative of a predefined environmental hazard or operational problem (e.g., a temperature detected in excess of a set threshold, tank pressure climbing at an unsafe level), the IoT device may identify the problem and prioritize IoT events according to an event prioritization management scheme that is specific to the nature and/or severity of the problem detected. As used herein, the term "IoT events" is intended to encompass the transmission of outgoing event messages and telemetry as well as execution of incoming commands.

In one implementation, an IoT device analyzes sensor metrics collected by one or more sensors of the IoT device that monitor a surrounding physical environment, referred to herein as "environmental sensors." Exemplary environmental sensors include without limitation sensors that monitor air quality, water quality, turbines (e.g., speed, energy production), as well as characteristics of motors, pumps, homes, patient monitors, etc. By analyzing sensor metrics collected by such sensor(s), the IoT device self-computes a condition indicator also referred to herein as a "device condition (DevCon) indicator" or "DevCon value." The condition indicator is to be understood as a metric that is indicative of satisfaction or non-satisfaction of various pre-defined (e.g., developer-specified) anomaly criteria and more specifically, indicative of one or more environmental or device anomalies that are detectable via analysis of environmental sensor data collected by the IoT device.

In one implementation, the DevCon indicator is a numerical annotation (e.g., 1-5) indicative of a criticality of one or more anomalies associated with the satisfied predefined anomaly criteria. For example, a set of the predefined anomaly criteria may be satisfied when a temperature sensor reports a measurement in excess of a set threshold (e.g., a device or facility is overheating) or when a pressure rate spikes to an unsafe level (e.g., pressure in a natural gas tank is rising at an unsafe level). The IoT device implements an event prioritization scheme that is selected based on the DevCon indicator computed by the device. For example, the event prioritization schemes may provide rule(s) for prioritizing transmission of different types of event messages and telemetry and/or rules for prioritizing commands in an execution queue.

In one implementation, an event prioritization scheme provides for assigning an event priority (e.g., a numeric annotation) to each telemetry item and event message that is generated by the IoT device. The IoT device then selectively ignores or postpones processing of telemetry and events messages for which the assigned message priority is lower than the currently-assigned DevCon indicator. If, for example, a DevCon indicator is assigned on a numeric scale of 1-5 with '5' representing a high priority/critical anomaly, the event priority may be ranked on an identical numeric scale (1-5), such that the event priority can be compared directly to the DevCon indicator. If, for example, the DevCon indicator is level 4, the event prioritization scheme may provide for processing of events with an event priority of level 4 and greater, while causing the IoT device to selectively ignore or postpone processing of events with priority levels below the DevCon indicator (e.g., levels 1, 2, 3).

In still other implementations, the system 100 enforces an event prioritization scheme that provides for selective restriction of the type of commands that are executed by the IoT device. For example, incoming commands may be selectively ignored except in cases where a determined command priority permits execution of the command. For example, a flag may be received in association of a particular command that instructs the IoT device to "override" the current restriction on command execution. Alternatively, incoming commands may be pre-assigned numeric annotations on a scale comparable to the DevCon indicator assignment such that the event prioritization scheme may allow for execution of certain types of commands for which the assigned priority equals or exceeds the DevCon indicator. These and other implementations are explored more fully throughout discussion of the following figures.

Figure 1:
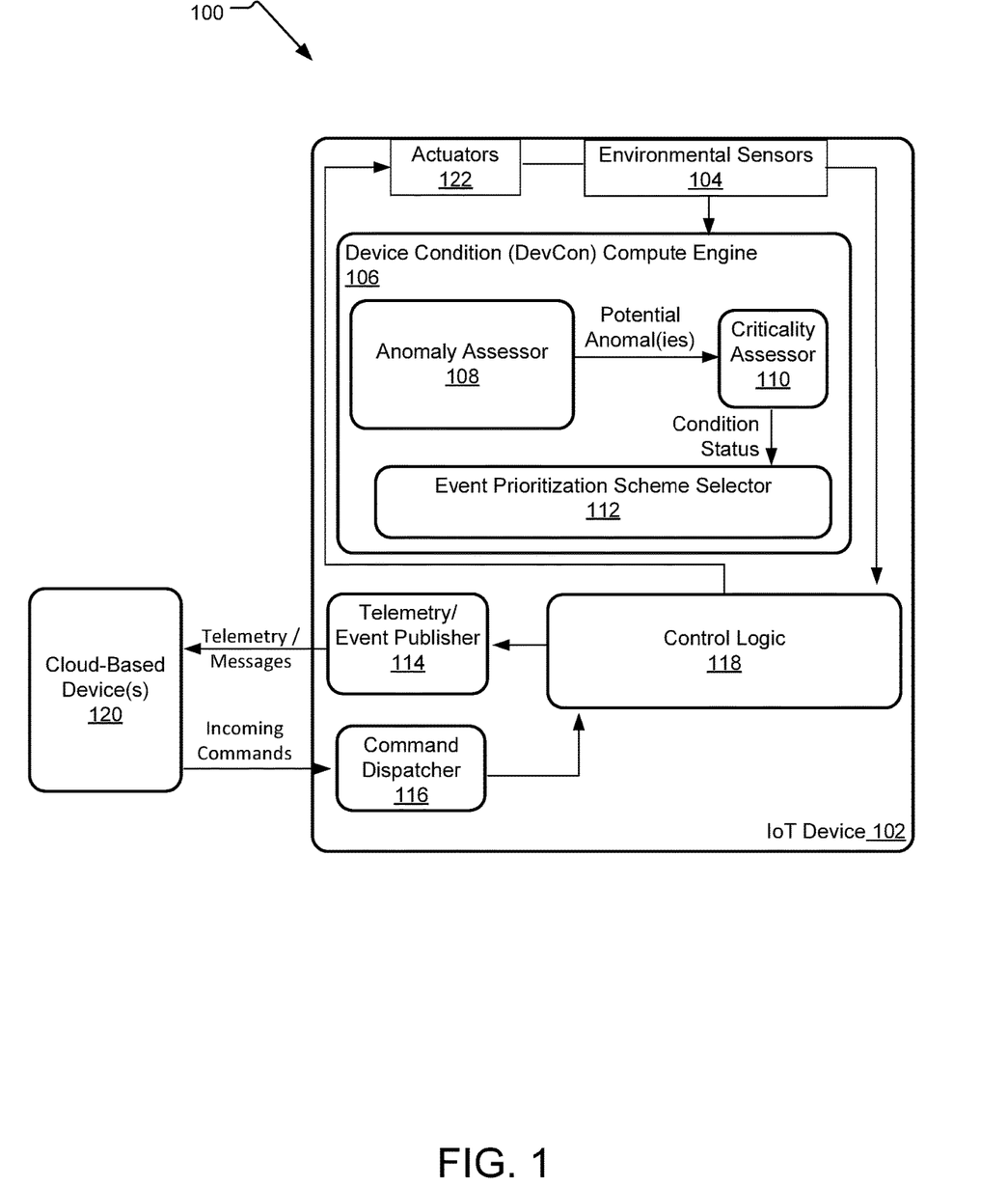
FIG. 1 illustrates an example system that includes an internet-of-things (IoT) device that self-computes a device condition indicator used to prioritize various types of device-cloud interactions.

FIG. 1 illustrates an example system 100 that includes an internet-of-things (IoT) device that self-computes a device condition indicator used to prioritize various types of device-cloud interactions and thereby reduce communication and processing latencies, particularly those pertaining to anomaly detection and resolution. The system 100 includes an IoT device 102 with one or more environmental sensors 104. The IoT device 102 is a computing device that is able to collect and transfer data over a wireless network without human intervention. Examples of IoT devices include, without limitation, fitness trackers, home automation device (e.g., smart security systems), smart watches, medical sensors, smart fire alarms and other home appliances, safety and monitoring equipment. The IoT device 102 includes a collection of software and hardware elements including, for example, local memory (volatile and/or non-volatile) and a processor as well as logic (e.g., firmware) that may be stored in the memory and executed by the processor. In FIG. 1, the components shown internal to the IoT device 102 may be assumed to each include either hardware, software, or a collection of both.

The IoT device 102 communicates with one or more cloud-based devices 120, such as a cloud-based server or an IoT hub that provides services for managing data flows between web-based IoT application(s) and the IoT devices managed by those IoT applications. For example, the cloud-based devices 120 may include an IoT hub that communicates with the IoT device 102 to provision the device, store and manage data collected by the device, and ensure that the IoT device 102 operates as expected/designed. Various channels continuously flow I/O data between the cloud-based device(s) 120 and the IoT device 102. Specifically, the cloud-based device(s) 120 may send the IoT device 102 commands for execution, such as commands for performing actions by one or more actuators 122 of the IoT device 102, retrieving data collected by one or more environmental sensors 104 or metrics computed by control logic 118 of the IoT device 102, write commands such as firmware updates, read commands such as device health and safety parameter checks, etc. In response to the incoming commands, the IoT device 102 performs various actions such as to retrieve requested information (e.g., by reading stored data), updating firmware, controlling actuators to perform requested tasks, computing requested metrics, etc. In addition to executing commands received from the cloud-based devices 120, the IoT device 102 may also execute self-generated commands, such as commands to perform prescheduled activities (e.g., garbage collection, defragmentation), etc.

All of the above-described activities of the IoT device may generate outward-bound telemetry and messages, which are sent over the cloud to the cloud-based devices 120. Notably, many of the IoT events (message, commands, telemetry) flowing to and from the IoT device 102 are repeated many times throughout each day. For example, certain messages or activities may be performed every minute or multiple times per minute.

When the IoT device 102 experiences an anomaly, the IoT device 102 may be temporarily unable to process certain types of IoT events. If, for example, the IoT device 102 is experiencing severe vibrations (e.g., as reported by one or more on-board vibration sensors or the vibration sensors attached to a motor being monitored by the device), the IoT device 102 or the equipment to which the device is attached may experience certain performance degradation and may, for example, have difficulty operating on-board components that are particularly sensitive to vibration. If the IoT device 102 is unable to operate nominally, the IoT device 102 may be incapable of processing certain types of commands. Yet, in many existing systems, commands and outgoing event message are continuously generated and added to processing queues regardless of the type of criticality of the anomaly impacting operation of the IoT device.

Even if a particular anomaly does not negatively impact the functionality of the IoT device (e.g., the performance of the device is unaffected), the anomaly my still render certain types of IoT events inconsequential and undesirably congest communication pathways that could otherwise support quicker diagnosis and response to the anomaly. If, for example, environmental sensors 104 of the IoT device 102 detect a high temperature indicative of an unsafe local condition (e.g., a potential facility fire or meltdown), the benefits of conveying this information to an operator may temporarily outweigh those of conveying routine event messages relating to device firmware updates, data backups, etc. And yet, many existing systems provide no mechanism for prioritizing IoT events in such circumstances, leading to inconvenient and, at times, potentially dangerous latencies in the transmission and processing of anomaly-related data. Likewise, the environmental sensors 104 may detect excessive vibrations as an early indicator that equipment, like a motor, is under high stress or likely to break. This can create a mechanically urgent situation and yet, the IoT device may lack any way to prioritize I/O data conveying information relating to this dangerous condition.

To overcome the above-noted challenges and expedite transmission and processing of communications related to detectable anomalies, the IoT device 102 includes a device condition (DevCon) compute engine 106 that selectively implements an event prioritization scheme based on the type(s) of anomalies detected and based on a determined criticality (priority) of these detected anomalies.

As used herein, the term "anomaly" is used to refer to an abnormal (anomalous) condition or event that is detectable by analyzing data collected by environmental sensors 104 of an IoT device. Detectable anomalies may include anomalous events happening within a physical surrounding environment (e.g., air quality, water quality) as well as anomalous events effecting functionality of the IoT device itself or of machinery monitored by the IoT device. For example, the IoT device may monitor a motor, pump, or other physical equipment and detect anomalies impacting the functionality of such equipment.

Environmental sensors refer to sensors that collect data usable to make inferences about the physical environmental either external to or internal to the device. Some detectable anomalies may cause the IoT device 102 to malfunction in some way and therefore negatively impact device performance while other detectable anomalies may have no direct impact on performance of the IoT device (e.g., the IoT device 102 may detect that pressure in a fuel tank is climbing at an unsafe level but the IoT device 102 is still able to monitor the system exactly as designed).

In FIG. 1, the DevCon compute engine 106 is shown to include three subcomponents—an anomaly assessor 108, a criticality assessor 110, and an event prioritization scheme selector 112, that perform different roles in dynamically selecting and enforcing an event prioritization scheme based on metrics computed from data collected by environmental sensors 104. The anomaly assessor 108 receives and analyzes data collected by the environmental sensors 104 and, based on such analysis, determines satisfaction or non-satisfaction of various predefined anomaly criteria. For example, a developer may define various detectable anomalies and the criteria that, if observed by the IoT device 102, indicate the occurrence and detection of such anomal(ies).

Notably, the nature and number of anomalies that are detectable by each IoT device may depend upon the purpose and nature of the device. If, for example, the IoT device 102 is a smart home safety device, a developer may configure the device with a predefined anomaly name (e.g., "fire") and satisfaction criteria (e.g., a fire is detected when the temperature sensors report three consecutive temperature readings in excess of a set threshold). Some anomalies may depend on satisfaction of more than one sensor input. If, for example, the IoT device 102 is a home security system, a developer may configure the device with a predefined anomaly name "entry" that is detected when a window or door sensor is tripped at a particular egress point. In the same system, the developer may have predefined another anomaly named "unauthorized entry" that is detected when a window or door sensor is tripped in combination with other circumstances, such as if a proper code is not provided to a system touch pad to silence an alarm within a predefined time interval.

The anomaly assessor 108 may include logic for computing various metrics using data collected by the environmental sensors 104 and further analyze such metrics in view of the predefined anomaly criteria to determine satisfaction or non-satisfaction of the different predefined anomalies on an ongoing (e.g., continuous or periodic) basis). When the anomaly assessor 108 determines that the predefined anomaly criteria are satisfied with respect to one or more anomalies, the detected anomal(ies) are provided to a criticality assessor 110, which in turn computes a condition indicator (the DevCon indicator) based on the detected anomalies. In general, the DevCon indicator may be understood as a metric quantifying a severity or criticality of one or more detected anomalies.

The DevCon indicator may have different forms in different implementations. In one implementation, the DevCon indicator is represented as a numerical annotation (e.g., levels 1-5) with increasingly higher-number annotations indicating increased criticality and priority. In one such implementation, the anomaly assessor 108 retrieves the name of the DevCon indicator from a look-up table or other logic responsive to determine that the associated anomaly criteria are satisfied. In cases where multiple anomalies are simultaneously detected, the criticality assessor 110 may implement further logic to compute or select the DevCon indicator. For example, the criticality assessor 110 may opt to select the DevCon indicator associated with the detected anomaly that is of higher priority when multiple simultaneous anomalies are detected.

Once the DevCon indicator is determined, the DevCon indicator is provided to an event prioritization scheme selector 112. The event prioritization scheme selector 112 selectively implements one of multiple predefined event priority schemes based on the determined DevCon indicator. Each of the different selectable event priority schemes provides a set of rules usable by control logic 118 to determine how to handle each IoT event (e.g., whether to transmit or ignore different types of messages and/or whether to execute or ignore different types of commands).

According to one implementation, the selected IoT event prioritization scheme provides processing of a subset of IoT events with an assigned event priority greater than or equal to a predefined priority threshold. If, for example, the DevCon indicator is numerical (e.g., on a scale of 1-5), the event priority scheme selector may enforce a scheme ensuring that event processing is limited to a particular subset of events with a defined "event priority" that equals or exceeds the numerical value of the DevCon indicator. In one such implementation, each of the different event prioritization schemes assigns an event priority (e.g., on a numerical scale 1-5) to each of multiple different types of IoT events that may be generated by the IoT device 102. For example, messages confirming routine activities may be assigned a priority of '1' and messages pertaining to anomaly detection are assigned a higher priority, such as '5.' If, in this scenario, the DevCon indicator is '4' (on the 1-5 scale) the selected prioritization scheme may provide for transmission of messages with an event priority equal to or higher than 4 while ignoring or postponing transmission of messages with an assigned event priority lower than 4.

Alternatively, a selected scheme may use other (e.g., non-numerical) criteria to determine how to prioritize different types of IoT events given the determined DevCon indicator. For example, an event priority scheme may explicitly list commands or message types that are to be treated as high or low priority within the given scheme (e.g., listing commands or messages that are to be selectively executed, selectively ignored, or otherwise specially handled).

Once dynamically selected, the event priority scheme is implemented by the control logic 118 of the IoT device 102. Responsive to receipt or generation of each IoT event, the control logic 118 refers to rules or logic within the selected event priority scheme to determine how to handle the event. For example, certain outgoing telemetry and event messages (collectively referred to herein as IoT event messages) are transmitted while others are ignored or delayed. Likewise, certain incoming commands may be selectively executed while others are ignored or delayed. Further examples of event priority scheme enforcement are discussed below with respect to FIG. 2-4.

Figure 2:
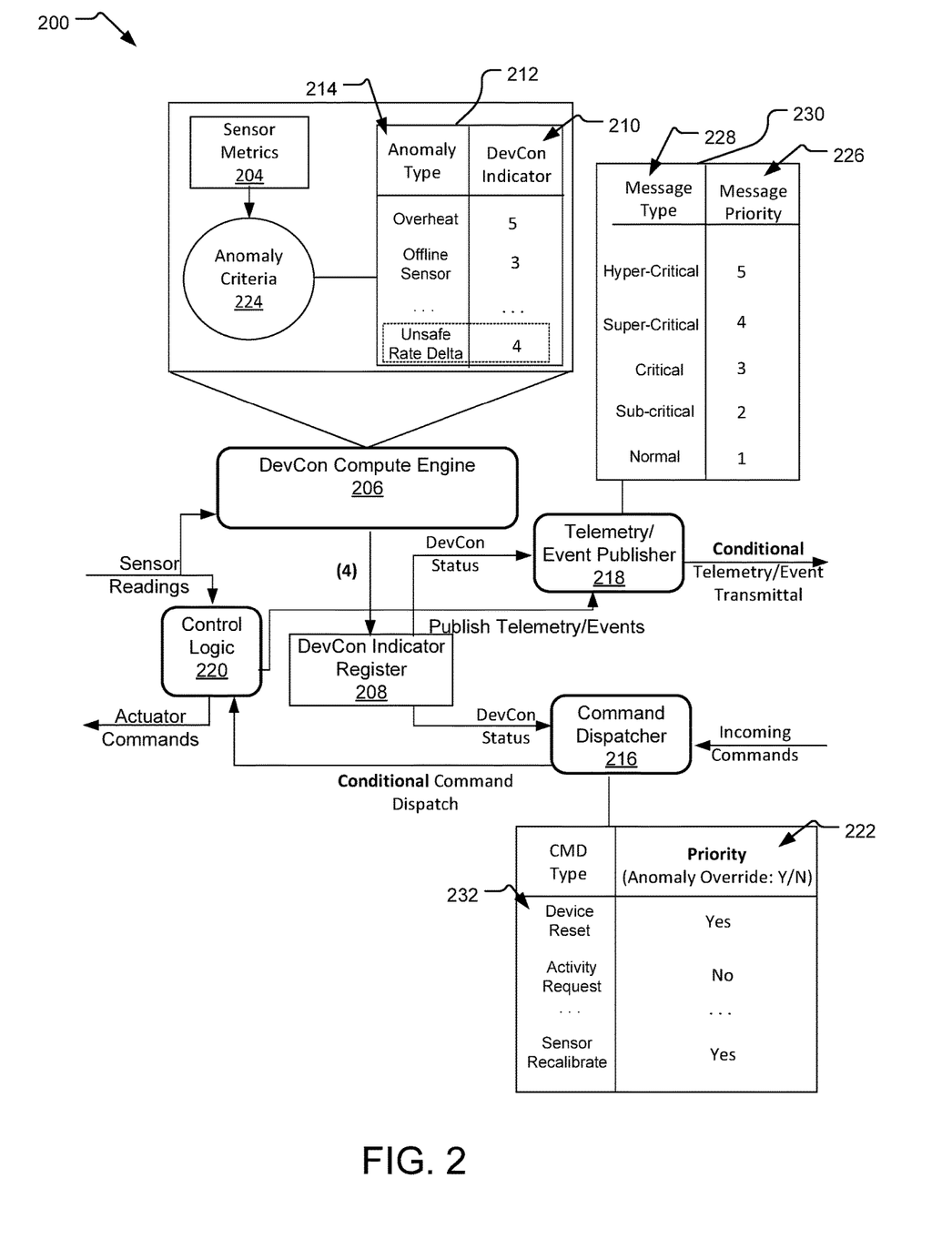
FIG. 2 illustrates an example IoT device that prioritizes various types of device-cloud interactions based on a self-computed device condition indicator.

FIG. 2 illustrates an example IoT device 200 that prioritizes various types of device-cloud interactions based on a self-computed device condition (DevCon) indicator. During operations of the IoT device 200, a DevCon compute engine 206 repeatedly performs operations for computing (and re-computing) the DevCon indicator based on sensor data 204 collected by one or more sensors (not shown) of the IoT device 200. The DevCon compute engine 206 analyzes the collected sensor data in view of predefined anomaly criteria 208, which may be the same or similar to that described with respect to FIG. 1. Based on a determined satisfaction or non-satisfaction of one or more sets of the anomaly criteria 208, the DevCon compute engine 206 determines whether the detected sensor data 204 is indicative of one or more anomalies. In the illustrated implementation, a developer predefines the various anomalies (e.g., anomaly type 214) and the anomaly criteria 208 associated with each that is evaluated to determine whether the associated anomaly has been detected. The developer further defines a DevCon indicator in association with each anomaly type, as shown in the example table 212.

In FIG. 2, the DevCon indicator 210 is a numerical annotation selected from a scale of 1-5 (although other scales could be used), where increasing values indicate increased severity of detected event and priority of rapid response. In the illustrated example, the DevCon compute engine 206 detects an exemplary anomaly type "unsafe rate delta" with a DevCon indicator of '4.' The DevCon compute engine 206 stores the DevCon indicator in a memory location (labeled in FIG. 3 as a "DevCon Indicator Register 224") that is accessible to both a telemetry/event publisher 218 and a command dispatcher 216 of the IoT device 200.

The DevCon compute engine 206 monitors the incoming (real-time) data from the environmental sensors 204, which are to be interpreted as including sensors that monitor the physical surrounding environment and/or sensors that monitor the environment internal to the IoT device (e.g., sensors monitoring the device's own health and safety). This incoming data is monitored on a periodic or continuous basis and dynamically updates the DevCon indicator to reflect detected changes in environmental conditions. If, for example, the collected sensor data 204 ceases to satisfy the anomaly criteria 224 for a previously-detected anomaly, the DevCon compute engine 206 may downgrade the DevCon indicator to a default level (e.g., 1) or to another level corresponding to an ongoing anomaly of lesser priority, if one exists.

This DevCon indicator is usable by device management electronics to implement a select event prioritization scheme that is based on the DevCon indicator (e.g., different prioritization rule(s) are implemented depending on the value of the DevCon indicator). In different implementations, the foregoing may be achieved in various ways. In the example of FIG. 2, prioritization of outgoing event messages is achieved by assigning each of multiple different message types 228 a numeric message priority 226. The message priority is selected from the same numeric scale as the DevCon indicator (e.g., 1-5). In FIG. 2 a table 230 illustrates exemplary event message types: hyper-critical, priority=5 (e.g., shutdown state as measured by sensors); super-critical, priority=4 (e.g., uncontrollable error state); critical, priority=3 (e.g., critical errors but controllable); sub-critical, priority=2 (e.g., warning level); and normal, priority=1 (e.g., regular operations).

The telemetry/event publisher 218 enforces an event prioritization scheme that provides for ignoring or delaying processing of event messages with a message priority that is at or below the current DevCon indicator value. If, for example, the DevCon indicator register 208 is currently storing a "4," the telemetry/event publisher 218 conditionally processes only those IoT event messages with an associated message priority that exceeds or equals '4.' For example, the telemetry/event publisher 218 publishes (transmits) IoT event messages with an assigned message priority of level 4 or 5 but declines to publish IoT event messages with an assigned message priority less than 4.

In the example of FIG. 2, the IoT device 200 prioritizes incoming commands in a manner slightly different than outgoing IoT event messages. This prioritization is based on the DevCon indicator that is saved in the DevCon indicator register 208 and also on a priority status 222 that may be assigned to the IoT device 200 or received in association with commands of different command type (e.g., command types 232).

The priority status 222 for commands can be set in a variety of different ways. In one implementation, incoming commands are received in association with a binary flag indicating whether or not the command is to be executed when the IoT device 200 is actively observing an anomaly. When, for example, the anomaly override flag is set to a "true" value for a command, the command dispatcher 216 dispatches the command to control logic 220 where the command is executed even if the IoT device is currently observing an anomaly (e.g., the DevCon indicator register 208 stores a value that is different than a default value). Alternatively, when the anomaly override flag of an incoming command is set to a "false" value, the command dispatcher 216 declines to dispatch the command. Consequently, the control logic 220 does not receive the command and the command is not executed.

In the above implementation, the anomaly override flag may be set by a cloud-based host device (hub) and transmitted as part of (or in association with) each command. Alternatively, the command dispatcher may manage a look-up table indicating whether or not each command or command type category is to be regarded as an "anomaly override" command that is executed upon receipt regardless of the nature of the anomal(ies) the IoT device 200 is currently observing.

In still yet another implementation, different command types are pre-assigned different numeric priority levels, similar to the above-described priority scheme used to prioritize event messages. For example, the command dispatcher 216 may implement a command prioritization scheme that provides for executing commands with associated priority levels that equal or exceed the current DevCon indicator.

Notably, some implementations of the disclosed technology may not enforce priority schemes for both IoT event messages and incoming commands and may instead prioritize one or the other, or a subset of event messages and/or commands.

Figure 3:
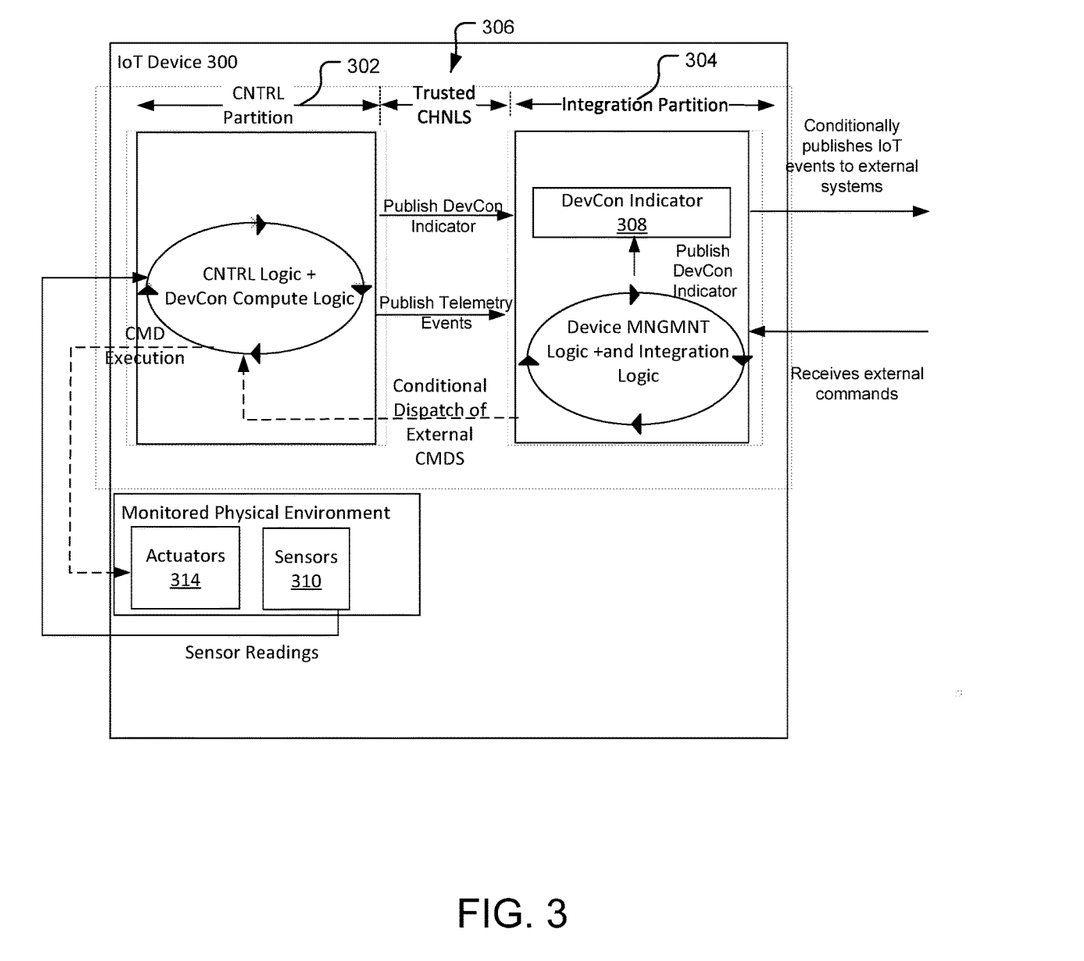
FIG. 3 illustrates yet another example IoT device that prioritizes various types of device-cloud interactions based on a self-computed device condition indicator.

FIG. 3 illustrates yet another example IoT device 300 that prioritizes various types of device-cloud interactions based on a self-computed device condition (DevCon) indicator 308. The IoT device 300 may be understood as including software and hardware elements similar to those described above with respect to FIG. 1-2; however, FIG. 3 is further annotated to indicate trust partitions that may be established between the different control elements of the IoT device 300 used to implement a select IoT event prioritization scheme.

Logically, the control elements of the IoT device 300 are divided into a control partition 302 and an integration partition 304 that bilaterally communicate across trusted channels 306. The control partition 302 may be understood as incorporating the control logic of the IoT device 300 that controls actuators 314 and retrieves data from sensors 310 within a monitored physical environment. In contrast, the integration partition 304 interfaces with external systems and incorporates the control logic of the IoT device 300 that performs device maintenance to ensure health and safety (e.g., firmware updates).

According to one implementation, the DevCon indicator 308 is computed exclusively by the control partition 302 but may be based on data collected by or logic executed by either partition. Since the integration partition 304 is exposed to external systems and the control partition 302 is not, the exclusive computation of DevCon values at the control partition 302 ensures that the DevCon values are tamper proof, preventing malicious external actors from overriding stored DevCon register values.

In one implementation, the control partition 302 and the integration partition 304 each include logic for detecting different types of anomalies, either based on observations within the associated partition or based on such observations in combination with data shared across the trusted channels 306. For example, the control partition 302 may be configured to detect anomalies of a defined first subset that are, for example, detectable exclusively by analyzing data collected by the environmental sensors 310 and/or by analyzing data derived by or otherwise known to logic within the control partition 302. In contrast, the integration partition 304 may be configured to detect anomalies of a defined second subset, such as by analyzing outputs of the control partition 302 in combination with data derived by or known to logic within the integration partition, such as data derived within the partition or retrieved from external systems (e.g., data indicating that the device firmware is outdated and may have certain vulnerabilities increasing the likelihood of certain anomalies).

The integration partition 304 conditionally publishes IoT events (messages, telemetry) to external system(s) based on the current DevCon indicator 308. For example, IoT events may be assigned a priority (e.g., as discussed above with respect to FIG. 2) and the integration partition conditionally publishes the IoT events with an assigned priority that equals or exceeds the current DevCon indicator 308.

Likewise, integration partition 304 also conditionally dispatches commands to control logic of the control partition 302 based on the current DevCon indicator 308. For example, incoming commands may be assigned a priority and executed conditionally when the assigned priority is equal to or greater than the DevCon indicator 308. For example, a command's priority may be specified via an "anomaly override" flag or other parameter, such as a parameter retrieved from a look-up table, received in association with the command, or otherwise determined. In the instance where a binary flag is used to indicate command priority, the binary value may convey a "yes/no" value, where a "yes" implies that the command has priority and should be executed regardless of the DevCon status and a "no" implies the command is to be ignored if received while the DevCon indicator equals or exceeds a predefined nonnominal value (e.g., 2 or greater on a 1-5 scale). Dispatched commands are executed by control logic of the control partition such as to effect transmission of control signals to device actuators 314.

The use of trusted channels 306 ensures that the integration partition 304 trusts only the control partition 302 to computate the DevCon indicator 308, and the DevCon indicator 308 is therefore relatively tamper-proof to external systems. Such trust can be enforced in a number of ways including, for example, using a public key infrastructure (PKI).

Figure 4:
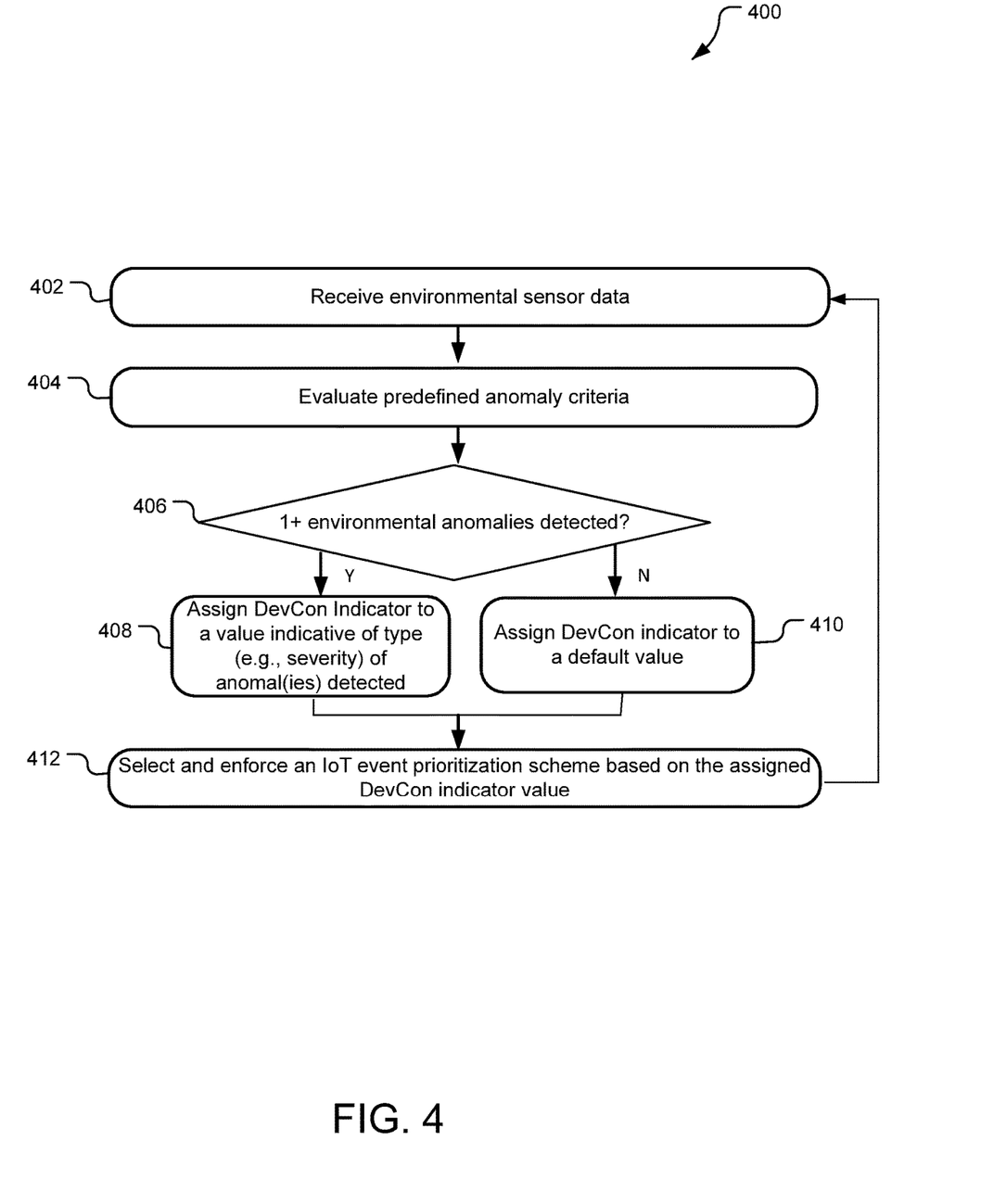
FIG. 4 illustrates example operations for prioritizing device-cloud interactions within an IoT device experiencing an anomaly.

FIG. 4 illustrates example operations 400 for prioritizing device-cloud interactions (e.g., event messages, commands) within an IoT device that is detecting an anomaly. A receiving operation 402 receives environmental sensor data from an environment that is being monitored by the IoT device. Although the environmental sensors may be physically coupled to and part of the IoT device, the sensors may in some implementations be physically separated from the IoT device but coupled to the IoT device over a wired or wireless communication channel. An evaluation operation 404 evaluates the received environmental sensor data in view of one or more sets of predefined anomaly criteria. When one of the sets of predefined anomaly criteria is satisfied, the IoT device determines that it has "detected" a particular type of anomaly predefined in association with the set of criteria. A determination operation 406 determines whether the evaluation operation 404 has resulted in the detection of one or more predefined anomalies. If no anomalies have been detected, an assignment operation 410 sets a stored "DevCon indicator" value to a default setting, such as a numerical value indicating that the current anomaly status of the device is at a lowest-possible severity/priority level.

If, alternatively, the determination operation 406 determines that the evaluation operation 404 has resulted in the detection of one or more anomalies, another assignment operation 408 sets the DevCon indicator to a value that is based on the type (e.g. severity) of or number of anomalies detected. For example, the DevCon indicator may be a numeric value with higher numbers indictive of increased criticality or priority of response. In one implementation, the IoT device maintains a table associating each different type of developer-defined anomaly with a developer-set DevCon value or other metric(s) indicating severity of the anomaly or priority of response. The table may either include the DevCon indicator (e.g., for each different anomaly type) or be usable to compute the DevCon indicator.

A selection operation 412 selects an IoT event prioritization scheme based on the assigned DevCon indicator. In one implementation, the selected IoT event prioritization scheme conditionally permits event processing (e.g., transmission of messages, execution of commands) for a subset of IoT events with a designated priority satisfying predefined criteria relative to the DevCon indicator. For example, the selected IoT event prioritization scheme may conditionally permit processing of events designated as "anomaly override" events or of events that have an assigned numerical priority that equals or exceeds a numerical value of the DevCon indicator (conveying the priority of detected anomal(ies)).

As additional environmental sensor data is reported to the IoT device, the operations 400 may repeat, dynamically re-setting the DevCon indicator and selecting alternative IoT event prioritization schemes responsive to changes in the number or type of anomalies detected.

Figure 5:
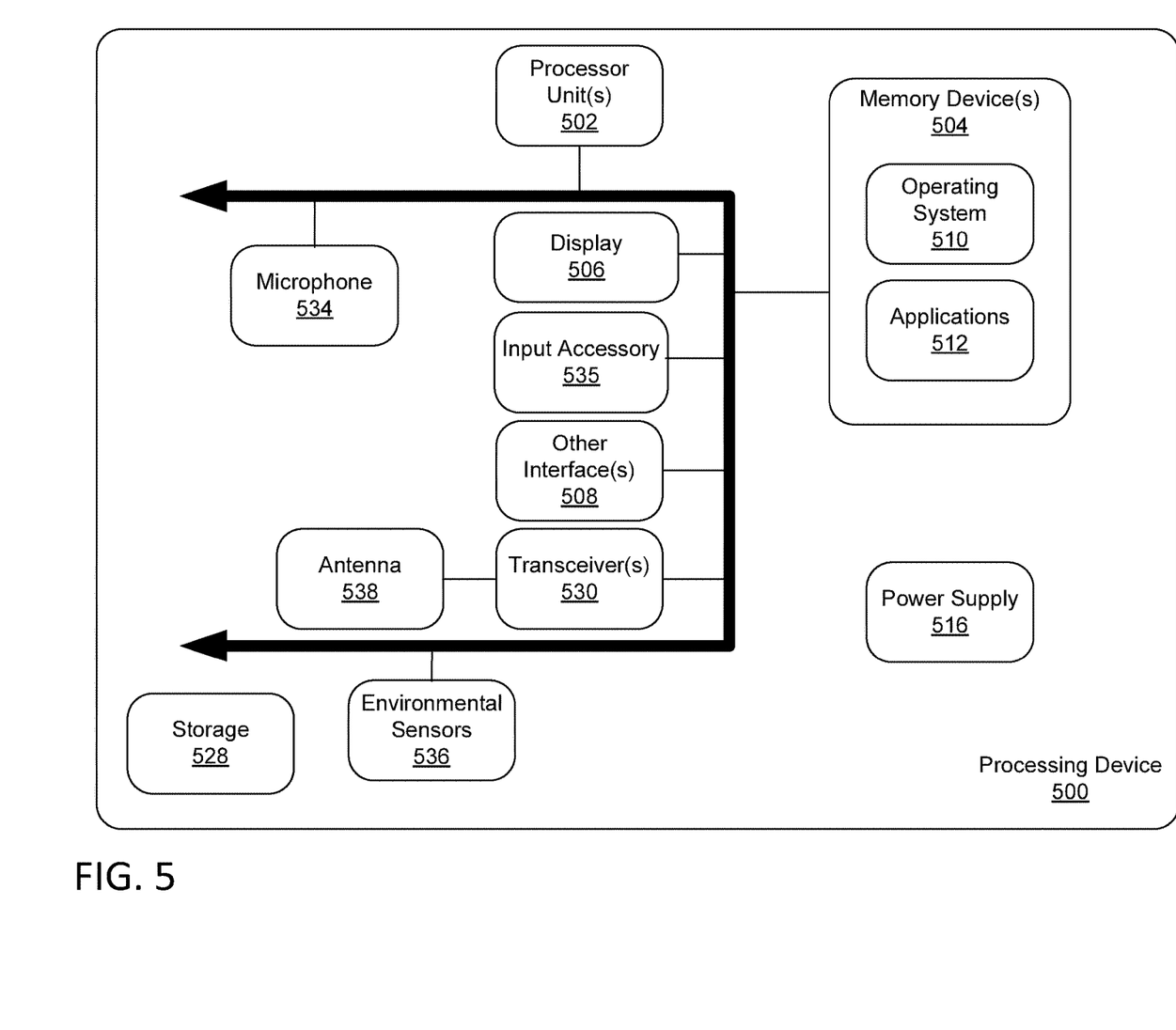
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as the DevCon compute engine 106, telemetry/event publisher 114, or command dispatcher 116 of FIG. 11 are loaded in the memory 544 and executed on the operating system 410 by the processor unit(s) 502. The applications 512 may receive input from various input devices such as a microphone 934 or input accessory 536 (e.g., keypad, mouse, stylus, touchpad, gamepad, racing wheel, joystick). The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 which may provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed.

In an example implementation, a mobile operating system, various applications and other modules and services may have hardware and/or software embodied by instructions stored in memory 504 and/or storage devices 528 and processed by the processor unit(s) 502. The processing device 500 may include a variety of tangible computer-readable storage media and intangible computer-readable communication signals. Tangible computer-readable storage can be embodied by any available media that can be accessed by the processing device 550 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method disclosed herein provides for analyzing sensor data collected by an IoT device to evaluate predefined anomaly criteria; dynamically assigning the IoT device a condition indicator; and selectively implementing an IoT event prioritization scheme based on the dynamically-assigned condition indicator. The condition indicator is based on the evaluation of the predefined anomaly criteria and indicative of detection or non-detection one or more potential anomalies.

In another example method of any preceding method, the condition indicator is a number indicative of a criticality of one or more detected potential anomalies.

In yet still another example method of any preceding method, the method further provides for assigning an event priority to each event message that is generated by the IoT device. In this implementation, selectively implementing the IoT event prioritization scheme further comprises selectively processing a subset of IoT events for which the assigned event priority satisfies a priority threshold while postponing processing of other IoT events for which the assigned event priority does not satisfy the priority threshold.

In still another example method of any preceding method, the method further provides for assigning an event priority to each event message that is generated by the IoT device. In this implementation, selectively implementing the IoT event prioritization scheme further comprises selectively implementing one or more rules governing transmission of outgoing event messages based on the event priority assigned to each of the event messages.

In another example method of any preceding method, the IoT event prioritization scheme further provides for preventing transmission of a greater number of event messages when the condition indicator is indicative of a higher criticality than when the condition indicator is indicative of a lower criticality.

In another example method of any preceding method, selectively implementing the IoT event prioritization scheme further comprises selectively implementing a set of rules governing execution of commands received by the IoT device.

In yet another example method of any preceding method, selectively implementing the IoT event prioritization scheme further comprises selectively executing some incoming commands while declining to execute other incoming commands based on a command priority associated with each command.

In another example method of any preceding method, the command priority is determined based on a flag received in association with each of the incoming commands.

An example device disclosed herein includes a device condition compute engine stored in memory and executable to analyze sensor data collected by an IoT device to evaluate predefined anomaly criteria; dynamically assign the IoT device a condition indicator; and selectively implement an IoT event prioritization scheme based on the dynamically-assigned condition indicator. The condition indicator is based on the evaluation of the predefined anomaly criteria and indicative of detection or non-detection one or more potential anomalies.

In another example device of any preceding device, the condition indicator is a number indicative of a criticality of one or more detected potential anomalies.

In another example device of any preceding device, the device further comprises control logic that assigns an event priority to each event message that is generated by the IoT device and that selectively processes a subset of IoT events for which the assigned event priority satisfies a priority threshold while postponing processing of other IoT events for which the assigned event priority does not satisfy the priority threshold.

In still another example device of any preceding device, the device further comprises control logic that assigns an event priority to each event message that is generated by the IoT device and that selectively implements one or more rules governing transmission of outgoing event messages based on the event priority assigned to each of the event messages.

In yet still another example device of any preceding device, the IoT event prioritization scheme provides for preventing transmission of a greater number of event messages when the condition indicator is indicative of a higher criticality than when the condition indicator is indicative of a lower criticality.

In still another example device of any preceding device, the device further comprises control logic that selectively implements a set of rules governing execution of commands received by the IoT device.

In another example device of any preceding device, the device condition compute engine is configured to implement the IoT event prioritization scheme by selectively executing some incoming commands while declining to execute other incoming commands based on a command priority associated with each command.

In still another example device of any preceding device, the command priority is determined based on a flag received in association with each of the incoming commands.

An example tangible computer-readable storage media disclosed herein encodes computer-executable instructions for executing a computer process comprising: analyzing sensor data collected by an IoT device to evaluate predefined anomaly criteria; dynamically assigning the IoT device a condition indicator; and selectively implementing an IoT event prioritization scheme based on the dynamically-assigned condition indicator. The condition indicator is based on the evaluation of the predefined anomaly criteria and indicative of detection or non-detection one or more potential anomalies.

In still another example tangible computer-readable storage media of any preceding storage media, the condition indicator is a number indicative of a criticality of one or more detected potential anomalies.

In yet still another example tangible computer-readable storage media disclosed herein, the computer process further comprises assigning an event priority to each event message that is generated by the IoT device. In this implementation, selectively implementing the IoT event prioritization scheme further comprises selectively processing a subset of IoT events for which the assigned event priority satisfies a priority threshold while postponing processing of other IoT events for which the assigned event priority does not satisfy the priority threshold.

In still another example tangible computer-readable storage media disclosed herein, the computer process further comprises assigning an event priority to each event message that is generated by the IoT device. In this implementation, selectively implementing the IoT event prioritization scheme further comprises selectively implementing one or more rules governing transmission of outgoing event messages based on the event priority assigned to each of the event messages.

An example system disclosed herein includes: a means for analyzing sensor data collected by an IoT device to evaluate predefined anomaly criteria; a means for dynamically assigning the IoT device a condition indicator; and a means for selectively implementing an IoT event prioritization scheme based on the dynamically-assigned condition indicator. The condition indicator is based on the evaluation of the predefined anomaly criteria and indicative of detection or non-detection one or more potential anomalies.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    analyzing, by an Internet of things (IOT) device, sensor data collected by the IoT device to evaluate predefined anomaly criteria;
    dynamically assigning, by the IoT device, a condition indicator to the IoT device, the condition indicator being based on the evaluation of the predefined anomaly criteria and indicative of detection or non-detection of one or more potential anomalies;
    assigning an event priority to each event message that is generated by the IoT device; and
    selectively implementing, by the IoT device, an IoT event prioritization scheme based on the dynamically-assigned condition indicator, the IoT event prioritization scheme defining a prioritization order for handling different types of IoT events within the IoT device, the IoT event prioritization scheme providing for selectively processing a subset of IoT events for which the assigned event priority satisfies a priority threshold while postponing processing of other IoT events for which the assigned event priority does not satisfy the priority threshold.

2. The method of claim 1, wherein the condition indicator is a number indicative of a criticality of one or more detected potential anomalies.

3. The method of claim 1, wherein selectively implementing the IoT event prioritization scheme further comprises:
    selectively implementing one or more rules governing transmission of outgoing event messages based on the event priority assigned to each of the event messages.

4. The method of claim 1, wherein the IoT event prioritization scheme provides for preventing transmission of a greater number of event messages when the condition indicator is indicative of a higher criticality than when the condition indicator is indicative of a lower criticality.

5. The method of claim 1, wherein selectively implementing the IoT event prioritization scheme further comprises:
    selectively implementing a set of rules governing execution of commands received by the IoT device.

6. The method of claim 5, wherein selectively implementing the IoT event prioritization scheme includes:
selectively executing some incoming commands while declining to execute other incoming commands based on a command priority associated with each command.

7. The method of claim 6, wherein the command priority is determined based on a flag received in association with each of the incoming commands.

8. An internet of things (IoT) device comprising:
a device condition compute engine stored in memory and executable to:
analyze sensor data collected by an IoT device to evaluate predefined anomaly criteria;
dynamically assign the IoT device a condition indicator, the condition indicator being based on the evaluation of the predefined anomaly criteria and indicative of detection or non-detection of one or more potential anomalies;
assigning an event priority to each event message that is generated by the IoT device; and
selectively implement an IoT event prioritization scheme within the IoT device based on the dynamically-assigned condition indicator, the IoT event prioritization scheme defining a prioritization order for handling different types of IoT events within the IoT device, the IoT event prioritization scheme providing for selectively processing a subset of IoT events for which the assigned event priority satisfies a priority threshold while postponing processing of other IoT events for which the assigned event priority does not satisfy the priority threshold.

9. The IoT device of claim 8, wherein the condition indicator is a number indicative of a criticality of one or more detected potential anomalies.

10. The IoT device of claim 8, wherein the IoT device further comprises control logic that:
selectively implements one or more rules governing transmission of outgoing event messages based on the event priority assigned to each of the event messages.

11. The IoT device of claim 8, wherein the IoT event prioritization scheme provides for preventing transmission of a greater number of event messages when the condition indicator is indicative of a higher criticality than when the condition indicator is indicative of a lower criticality.

12. The IoT device of claim 8, wherein the IoT device further comprises control logic that
selectively implements a set of rules governing execution of commands received by the IoT device.

13. The IoT device of claim 8, wherein the IoT device condition compute engine is configured to implement the IoT event prioritization scheme by selectively executing some incoming commands while declining to execute other incoming commands based on a command priority associated with each command.

14. The IoT device of claim 13, wherein the command priority is determined based on a flag received in association with each of the incoming commands.

15. One or more tangible computer-readable storage media encoding computer-executable instructions for executing a computer process comprising:
analyzing, by an Internet of things (IoT) device, sensor data collected by the IoT device to evaluate predefined anomaly criteria;
dynamically assigning, by the IoT device, a condition indicator, the condition indicator being based on the evaluation of the predefined anomaly criteria to the IoT device, the condition indicator being indicative of detection or non-detection of one or more potential anomalies;
assigning an event priority to each event message that is generated by the IoT device; and
selectively implementing, by the IoT device, an IoT event prioritization scheme based on the dynamically-assigned condition indicator, the IoT event prioritization scheme defining a prioritization order for handling different types of IoT events within the IoT device, the IoT event prioritization scheme providing for selectively processing a subset of IoT events for which the assigned event priority satisfies a priority threshold while postponing processing of other IoT events for which the assigned event priority does not satisfy the priority threshold.

16. The one or more computer-readable storage media of claim 15, wherein the condition indicator is a number indicative of a criticality of one or more detected potential anomalies.

17. The one or more computer-readable storage media of claim 15,
wherein selectively implementing the IoT event prioritization scheme further comprises:
selectively implementing one or more rules governing transmission of outgoing event messages based on the event priority assigned to each of the event messages.

* * * * *